United States Patent [19]
Rethorst

[11] Patent Number: 4,699,340
[45] Date of Patent: Oct. 13, 1987

[54] LAMINAR VORTEX PUMP SYSTEM

[75] Inventor: Scott Rethorst, South Pasadena, Calif.

[73] Assignee: Vehicle Research Corporation, Pasadena, Calif.

[21] Appl. No.: 744,501

[22] Filed: Jun. 13, 1985

Related U.S. Application Data

[63] Continuation-in-part of Ser. No. 549,668, Nov. 7, 1983, abandoned, which is a continuation-in-part of Ser. No. 325,554, Nov. 27, 1981, abandoned, which is a continuation of Ser. No. 113,575, Jan. 21, 1980, abandoned.

[51] Int. Cl.$^4$ .............................................. B64C 23/06
[52] U.S. Cl. .................................... 244/199; 244/200; 244/130; 114/56; 114/288
[58] Field of Search ............................. 244/198–200, 244/130, 14, 117, 119, 3.24; 114/56, 355–358, 288; 102/37.1, 34.1

[56] References Cited

U.S. PATENT DOCUMENTS

| | | | |
|---|---|---|---|
| 1,303,544 | 5/1919 | Dorr | 244/200 |
| 2,899,899 | 8/1959 | Hirsch | 244/3.24 |
| 3,038,179 | 6/1962 | Wagemaker | 114/358 |
| 3,075,489 | 1/1963 | Eichenberger | 244/130 |
| 3,117,544 | 1/1964 | Schoell | 114/56 |
| 3,369,775 | 2/1968 | Rethorst | 244/199 |
| 3,523,661 | 8/1970 | Rethorst | 244/199 |
| 3,578,264 | 5/1971 | Kuethe | 244/199 |
| 3,588,005 | 6/1971 | Rethorst | 244/200 |
| 4,022,143 | 5/1977 | Kreuzler | 114/56 |
| 4,225,102 | 9/1980 | Frosch et al. | 244/119 |

FOREIGN PATENT DOCUMENTS

| | | | |
|---|---|---|---|
| 845900 | 8/1952 | Fed. Rep. of Germany | 244/200 |
| 304262 | 1/1929 | United Kingdom | 244/200 |
| 922900 | 4/1963 | United Kingdom | 244/20 |
| 2022530 | 12/1979 | United Kingdom | 244/199 |

Primary Examiner—Galen Barefoot
Attorney, Agent, or Firm—Christie, Parker & Hale

[57] ABSTRACT

Streamwise ridges on a lifting wing intercept local flow consisting of free stream and spanwise crossflow to create a pattern of vortices over the wing and aligned with the ridge axes; the vortices act as suction pumps collecting low energy boundary layer fluid, ingesting such fluid into the core of the vortices, transporting it in the streamwise direction, and discharging it into the wake. Fresh fluid from the outer, free stream flow replaces the spent fluid withdrawn by the vortex array. This produces a favorable pressure gradient that maintains laminarity, avoiding the onset of boundary layer transition leading to turbulence. The favorable pressure gradient also suppresses separation on the back side of the wing, where the pressure gradient is normally positive and adverse. The accelerations of fluid resulting from the ridges is an order of magnitude greater than the usual streamwise accelerations produced by wing shape and friction resulting in low effective Reynolds' number dominating the boundary layer and corresponding to laminar flow. Close spacing of the ridges maximizes the interception of local flow. Each ridge is asymmetric in cross-section with a gentle ramp on its windward side and a steep bluff on its lee side to generate a standing vortex between two consecutive ridges. A slight inclination of the ridge with respect to the free stream direction at least aft of the wing's maximum thickness taps the flow in the free stream direction to augment the acceleration produced by spanwise crossflow.

21 Claims, 12 Drawing Figures

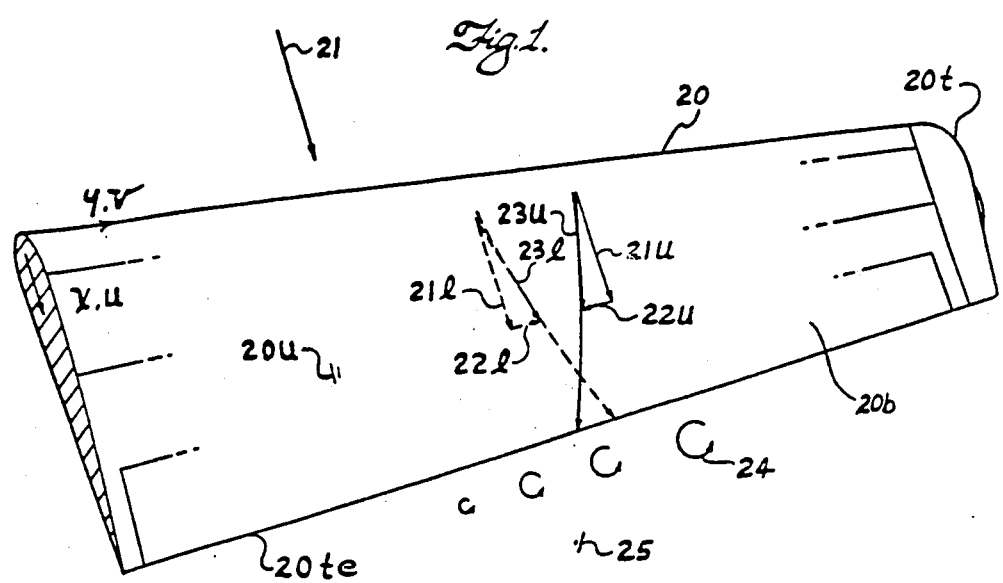
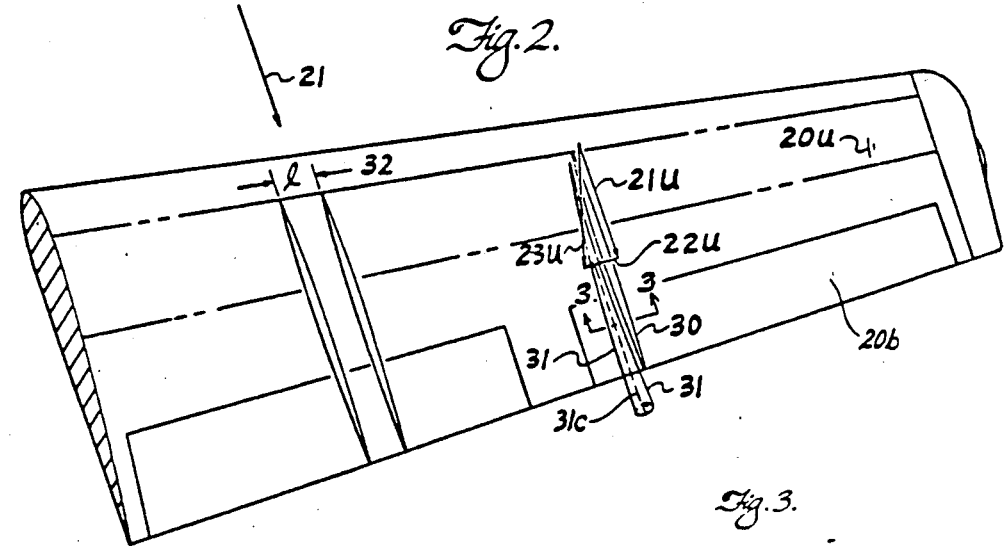
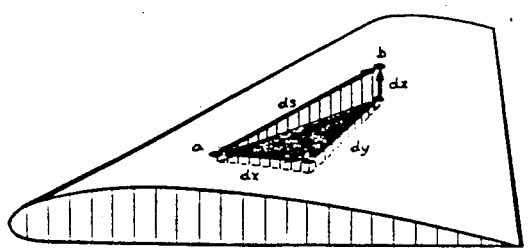
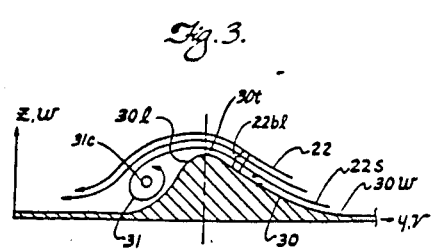

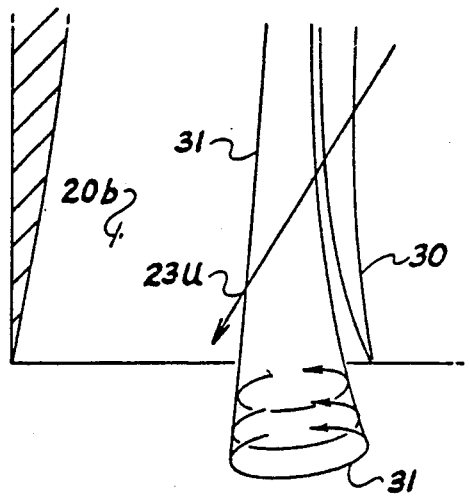
Fig.4.
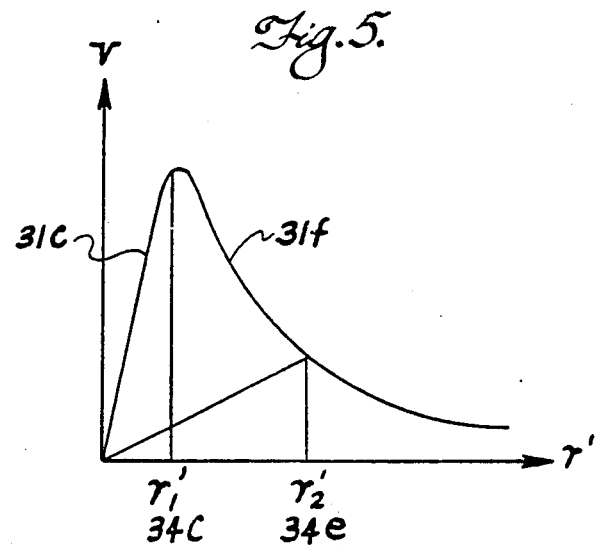
Fig.5.
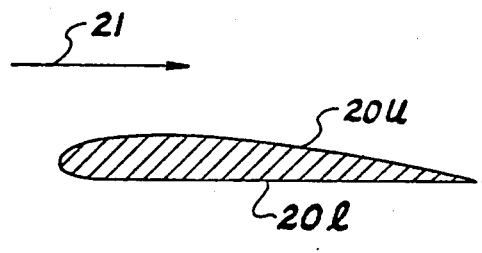
Fig.6.
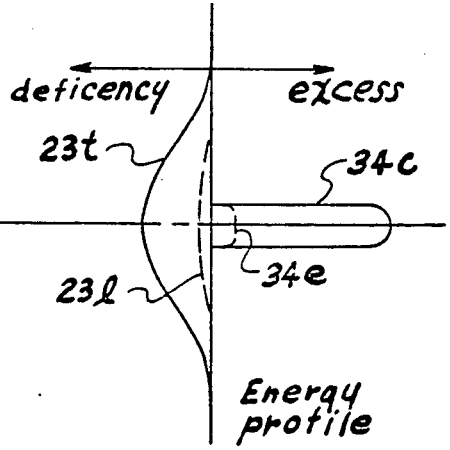
Energy profile
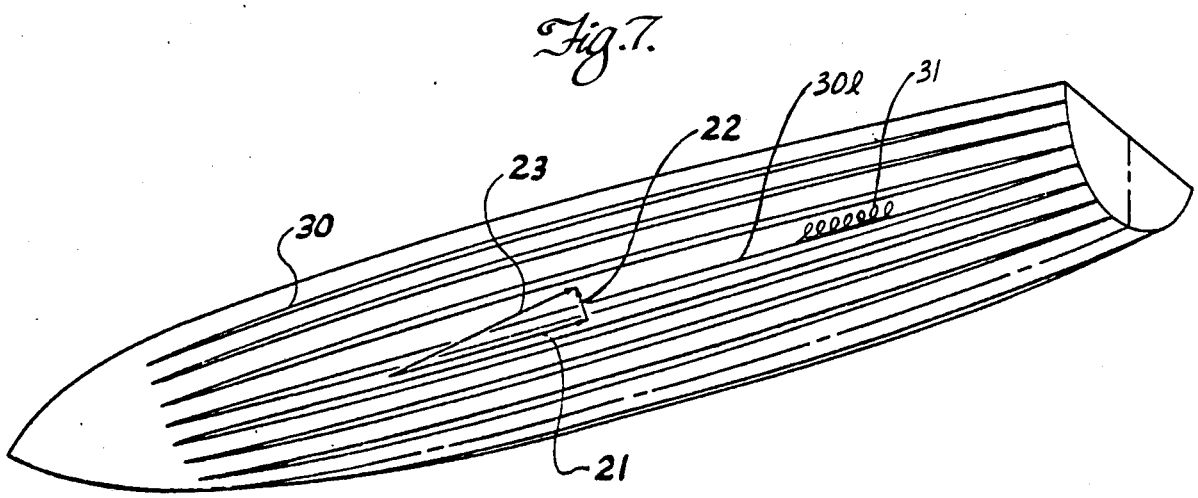
Fig.7.

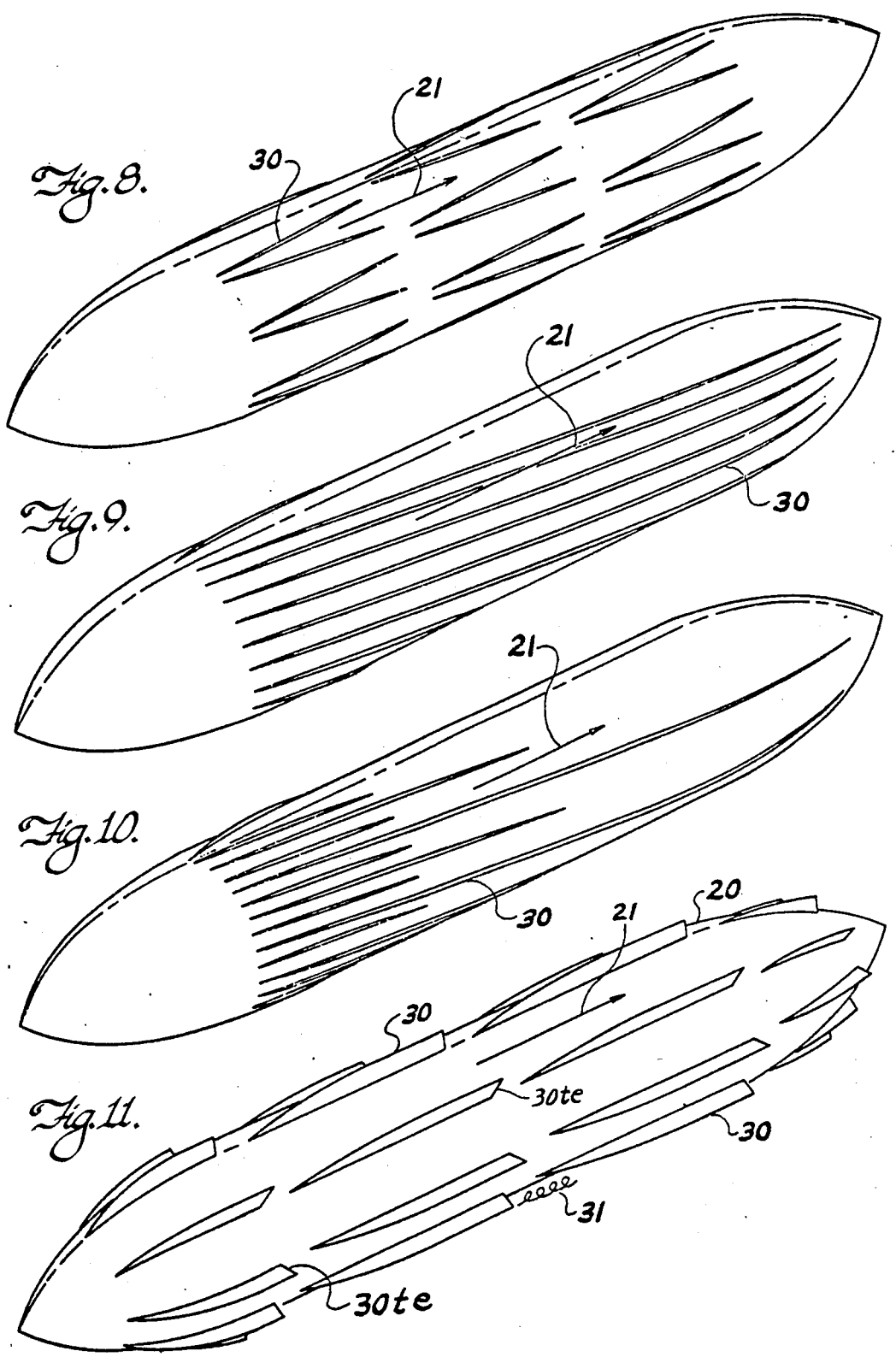

LAMINAR VORTEX PUMP SYSTEM

CROSS-REFERENCE TO RELATED APPLICATIONS

This is a continuation-in-part application of U.S. patent application Ser. No. 549,668 filed Nov. 7, 1983, now abandoned, which in turn was a continuation-in-part application of U.S. patent application Ser. No. 325,554 filed Nov. 27, 1981, now abandoned, which in turn was a continuation of U.S. patent application Ser. No. 113,575 filed on Jan. 21, 1980, now abandoned.

BACKGROUND OF THE INVENTION

Boundary layers are a manifestation of friction loss. Friction loss is lower in a laminar boundary layer than in a turbulent one. Both boundary layers exist in a typical wing. A fluid passing over a wing beginning at the leading edge flows for a distance with a laminar boundary layer then becomes turbulent close to the leading edge. The frictional losses occur because a no-slip condition at the wing surface imposes a shear in the flow from the surface up to the freestream.

Flow in a laminar boundary layer is smooth and in layers parallel to the solid surface, the layers being called stream surfaces. The friction at the surface between the fluid and the surface results in no velocity there; the velocity of the fluid progressively increases away from the surface to freestream where the effects of the wing surface no longer influence the flow.

Turbulent boundary layer flow is characterized by random interaction of vortex filaments which produce a fuller mean velocity profile than a laminar velocity profile. The fuller profile results from the cross motion of individual fluid particles with respect to the average direction of fluid motion in directions through the boundary layer and normal to the wing surface and transverse to the average direction of fluid motion and parallel to the wing surface. The crossflow exchanges momentum between particles and tends to blunt the velocity profile. The exchange of momentum in turbulent flow produces relatively large shear forces. In a turbulent boundary layer close to the solid surface the crossflow normal to the solid surface must go to zero because of the surface, and at the surface-fluid interface the velocity parallel to the surface must be zero because of friction; the region where this happens is called the laminar sublayer.

Because the random particle motion and exchange of momentum between faster and slower particles in a turbulent boundary layer do not occur in laminar boundary layer flow, the shear stress in a turbulent boundary layer is greater than in the laminar one. As a result, friction loss is greater in a turbulent boundary layer than in a laminar boundary layer.

Another characteristic of turbulent flow is the dominance of inertial forces over viscous forces when compared to laminar flow. In laminar flow disturbances smooth out and disappear because of viscosity; in turbulent flow disturbances are not smoothed out but increase with time, and that is why turbulent flow occurs. Reynolds' number is a measure of the ratio of inertial forces to viscous force. The transition from laminar to turbulent flow occurs usually at a critical Reynolds' number that depends on disturbances in the system being observed. In a majority of environments, turbulent flow occurs at a Reynolds' number of between 1,000 and 3,000. In some environments laminarity has been maintained at much higher Reynolds' numbers.

Reynolds' number includes a dimensional term and a velocity term. In aerodynamic analysis of wings, the dimensional term is usually the distance from the leading edge of the wing and the velocity term is the freestream velocity. In conventional analysis, this convention is perfectly acceptable because the change from laminar to turbulent flow generally depends on the distance from the leading edge and freestream velocity.

Frictional drag in a laminar boundary layer is an order of magnitude smaller than in a turbulent boundary layer. Because the typical wing operates with a turbulent boundary layer there is a corresponding large energy consumption resulting in major penalties on the efficiency and performance of vehicle propulsion systems.

It is well known that the evolution of laminar boundary layer flow into a turbulent boundary layer flow can be prevented by imposing a favorable pressure gradient in the flow: pressure decreasing in the direction of flow. Such a gradient can be provided by body shaping or suction. In this instance, individual fluid particles accelerate in the freestream direction in response to the negative pressure gradient to velocities much greater than crossflow velocities characteristic of turbulence; the velocity in the freestream direction dominates the flow, thus avoiding evolving into turbulence.

Attainment of such a gradient by shaping, however, is limited to the forepart of the body where diverging surfaces exist; the aft part of the body has converging surfaces in the direction of flow that result in adverse, positive pressure gradients in that direction which almost universally result in turbulent flow in practical vehicle application.

The provision of a favorable pressure gradient by suction, on the other hand, can in principle maintain laminar flow throughout the entire length of the body. This mechanism removes particles that have lost velocity in the freestream direction and replaces them with particles having appreciable velocities in the freestream direction, thus maintaining a favorable dominance of freestream velocity over crossflow terms and avoiding a turbulent opportunity. In the past, attempts have been made to provide such gradients through the use of internal suction acting through apertures in the body surface connected to a mechanically operated suction pump. Irregularities in the surface imposed by such apertures, the tendency of the apertures to clog up with foreign material, the network of tubing and plumbing with attendant frictional losses, and the necessity of a mechanical suction pump all burden the internal suction systems and make them impractical.

The payoff for an operable laminar flow system is large, and it is clear that this desirable result can be achieved if a practical means to provide an economic suction source can be devised. A passive system involving no moving parts, involving no external power sources, confined entirely to the external surface of a wing or body, and using only waste energy available for the task would be highly desirable.

SUMMARY OF THE INVENTION

The present invention provides a passive external suction system operated by energy otherwise wasted to maintain laminar flow across a body, such as a wing.

For a wing, a series of continuous ridges on the wing surface oriented generally in the freestream direction to intercept local flow consisting of natural spanwise crossflow and flow in the free stream direction to generate and sustain a standing vortex on the lee side of each ridge. The geometry of each ridge produces local accelerations in the freestream direction near the surface of the wing due to fluid dynamic cross coupling of an order of magnitude greater than the usual streamwise convective acceleration term, and an effective Reynolds' number corresponding to laminar flow. (The Reynolds' number is not based on the usual distance from the leading edge, but instead on a cross-section dimension of the ridge because it is the ridge that produces the favorable convective term in the freestream direction.) A low pressure within the vortex core provides a pressure sufficient to maintain a laminar boundary layer. To intercept substantially all of the boundary layer flow, the ridges are placed close enough together to assure interception at some practical design criterion, preferably in steady flight at cruise speeds. Preferably, the ridges extend substantially the freestream length of the wing so that vortices are formed forward of the maximum wing thickness and in the zone of maximum wing thickness to take advantage of the large spanwise velocities where the wing is thickest and assure that the vortices are on the wing. The spanwise velocities diminish aft of the wing's maximum thickness. To produce the desired vortices in this region, it may be necessary to incline the ridges to intercept a greater amount of the local flow flowing in the freestream direction. The ridges are preferably asymmetrical in cross-section with a gentle slope on their windward side and a steep bluff on their leeward side to assure the generation of vortices on the leeward side.

The low pressure within each vortex tube serves as a suction source to collect fluid that has lost a significant amount of stream velocity in the freestream direction from the laminar boundary layer, isolating this fluid from adjacent fluid, and removing a major contributor for transition from a laminar boundary layer to a turbulent boundary layer.

Removal of the fluid that has spent much of its free stream velocity from the boundary layer by this mechanism causes fresh fluid from the outer flow to be drawn downwards towards the surface to take the place of the spent fluid. The new fluid has not suffered a loss of velocity in the freestream direction from friction. Each fluid element thus spends only a small portion of its transit near the wing surface, losing some of its velocity in the freestream direction to friction but not enough to produce transition to turbulence. The unavoidable burden of viscous shear is spread over a larger mass of fluid and each fluid element suffers only a small loss of energy to friction, insufficient to cause evolution to turbulence. By maintaining the flow laminar, frictional losses are much lower.

The production of vortices on the wing plan form moves to that location vorticity that would otherwise be in the wake of the wing, as required by Helmholtz's theorem. Energy of this vorticity reduces frictional drag instead of being wasted in the wake.

These and other features, aspects and advantages of the present invention will become more apparent from the following detailed description, claims and drawings.

BRIEF DESCRIPTION OF THE DRAWINGS

FIG. 1 is a perspective view of a conventional, outboard wing-panel illustrating the inflow on the upper surface and the outflow on the lower surface, and their combination at the trailing edge of the wing generating a vortex sheet in the wake;

FIG. 2 is a perspective view of an outboard wingpanel of the present invention with typical streamwise ridges generating a vortex on its lee side for collecting spent boundary layer fluid;

FIG. 2a is a perspective view looking outboard and down on a wing illustrating the spacial coordinates associated with the Navier-Stokes equation, including the components in the vertical and transverse direction associated with cross-coupling;

FIG. 3 is a cross-sectional view (expanded) of the typical ridge and vortex on its lee side taken in the plane 3—3 of FIG. 2;

FIG. 4 is an expanded view of the trailing portion of a ridge on the upper surface of a wing showing its outboard inclination to accommodate the growth of its lee side vortex and the passage of the freestream flow over the vortex;

FIG. 5 is a plot of the velocity distribution in a typical vortex illustrating: (a) the core rotating as a solid body, and (b) the outer irrotational flow field; a conventional vortex of core radius $r_1'$ is illustrated for comparison with a vortex of expanded core radius $r_2'$;

FIG. 6 presents the energy profile in the wake behind a conventional wing, illustrating in solid lines both: (a) the energy deficiency due to turbulent flow in the boundary layer, and (b) the energy excess in the conventional trailing vortex system; the reduced profiles of both this deficiency and excess achieved by integrating the trailing vortex system with the boundary layer to provide laminar flow are shown dashed;

FIG. 7 illustrates the lateral pressure gradient provided across ridges on the bottom of a ship due to the hydrostatic depth variation;

FIG. 8 illustrates a paired ridge system on a body of revolution;

FIG. 9 illustrates symmetric arrays of ridges inclined conversely on opposing sides of a body of revolution;

FIG. 10 illustrates an array of ridges on a long body of revolution where alternate elements are faired out to accommodate vortex pairing; and FIG. 11 illustrates ridges on a body of revolution terminated within the body length in vertical trailing edges to discharge the vortices above the body surface.

DETAILED DESCRIPTION OF THE PREFERRED EMBODIMENTS

With reference to FIG. 1, an aircraft wing 20 has an upper surface 20u, a lower surface 20l, a tip 20t, and a trailing edge 20te. When the wing operates at a positive angle of attack in a fluid medium, say at a velocity 21 (the free stream velocity of the fluid relative to the wing), the wing generates a reduced pressure on its upper surface 20u and an increased pressure on its lower surface 20l. The pressure difference across the wing surface disappears at tips 20t because there is no longer structure to sustain a difference.

Accordingly, a spanwise pressure gradient on the upper wing surface 20u generates a crossflow of fluid on the upper surface with a velocity 22u directed towards the center of the span (the inboard end of the wing). This upper surface inflow velocity adds geometrically to the upper surface freestream flow velocity 21u to provide a resultant upper surface flow velocity 23u that is inclined inboard on the upper surface of the wing.

On lower wing surface 20l, the increased pressure generates a crossflow of fluid on the lower surface with a velocity 22l directed towards the wing tip. Again, this outflow adds to the freestream velocity under the wing 21l to provide a resultant undersurface flow of velocity 23l that is inclined outboard on the under surface of the wing.

These two opposing crossflow velocity components, 22u and 22l, on arriving at trailing edge 20te of the wing combine to generate an aft vortex sheet 24 in a wake 25. The vortex sheet is a series of vortices about axes in the freestream direction which rotate upwards on their outside and wrap up into a wing tip vortex. With two wings extending from a fuselage, the wings generate the familiar wingtip vortices of opposite rotation. These vortices are required by conservation of angular momentum, commonly expressed as Helmholtz's theorem, and usually described as a horseshoe vortex continuation of the lifting vortex line. For an aircraft operating at optimum cruise, this vortex system represents half the drag, half the work done by the aircraft, and half its energy consumption. Thus, the vortex system has considerable energy. But appearing as it does in a conventional wing aft of its trailing edge, the energy is generally wasted.

In the present invention, ridges 30 are located on both the upper and lower wing surfaces in such a way as to utilize the crossflow components to generate this trailing vortex system within the plan form of the wing itself. FIG. 2 shows such a ridge 30 on upper wing surface 20u. As shown in FIG. 3, which is an expanded view taken in the plane 3—3 of FIG. 2, ridges 30l have a gentle ramp 30w on their windward side that permits the flow to proceed upwards and over a top 30t of the ridge in a smooth, attached manner. A lee side 30l of ridge 30 has a steep bluff that causes the flow to separate and form a vortex 31, which rotates upward on the outside direction of the wing. These standing vortices 31 thus generated on the lee side of the ridges on wing surface 20u replace vortices 24 of FIG. 1 that appear aft of wing trailing edge 20te in wake 25; by the mechanism of the ridges and crossflow the vortices are now forward on wing surface 20u itself.

This new location of system of vortices 31 enables their energy to act as a vortex pump to remove spent fluid 22s (FIG. 3) that has lost velocity in the freestream direction through shear in the lower regions of the boundary layer 22bl. These vortices have energy that would be present anyway in the angular momentum of fluid in the wake, as shown in Helmholtz's theorem. The energy in the vortices on the wing plan form now serves the useful purpose of collecting, containing, and isolating spent fluid 22s from the wing surface 20u and allowing fresh fluid to be continually drawn down from the outer flow 22 into the sublayers of the boundary layer to maintain laminarity on the wing surface 20u by maintaining the velocity of the fluid there in the freestream direction high. The fresh fluid is analogous to the fluid that first sees the wing at the leading edge of the wing: it will maintain laminarity for a short distance along the wing surface because it has not lost sufficient momentum to shear to transcend to turbulence.

A vortex formed in this manner will have a reduced pressure in its core 31c that acts as a suction source to draw the fluid from boundary layer 22s up gentle ramp 30w on the windward side and into vortex core 31c on the steep, bluff-like lee side 30l of ridge 30. The lower regions of the boundary layer flow 22s, adjacent the wing surface, is very sensitive to these local spanwise pressure gradients since this fluid has lost considerable velocity and momentum in the freestream direction. Thus, the most de-energized fluid at the bottom of the boundary layer on the wing will have the greatest tendency to move toward the low pressure regions on the top of the ridge and into the vortex core in a given distance in the freestream direction. In contrast, more energetic fluid in the boundary layer further removed from the surface of the wing has an appreciable velocity in the freestream direction relative to crossflow velocity and will not be influenced as much by the low pressure in the vortex cores and on top of the ridges. The vortices thus collect and contain spent fluid 22s, the velocity and kinetic energy of which is lost to friction in the sharp velocity gradient near the wing surface.

The ridges are aligned in the freestream direction and preferably extend essentially the entire chord length of the wing. They increase in height in the freestream direction compatible with vortex growth, increasing intensity of the lateral pressure gradient, and increasing velocity of its crossflow until essentially the point of maximum wing thickness, and, thereafter, they decrease in height, fairing smoothly into the wing surface at its trailing edge 20te. The cross-section of the ridges being asymmetrical with a gently sloped windward side and a steeply sloped leeward side preferably varies with ridge height, getting wider as height increases and narrower as height decreases. The ridges streamwise extend as long as practical to insure that as much spanwise flow energy is used as is practical; however, because the spanwise flow drops off to zero as the trailing edge is approached, it is not as important to have ridges on the extreme aft portions of the wing as further forward to enjoy the benefits of the invention. The ridges should be essentially continuous to insure the maximum utilization of crossflow.

The ridges are spaced so that the boundary layer flow 22s proceeds for only a limited distance along the wing surface before being drawn into one of the standing vortices 31. To completely affect the wing with the mechanism of this invention, a lateral distance "l" (32) between ridges 30 is specified to be not greater than the ratio of the maximum spanwise velocity "V" (22) to maximum freestream velocity "U" (21) times the chord length "c" (33), i.e., $$l < \frac{v}{u} c$$

In this manner, the proximity of the ridges comprises a continuous suction network for the entire wing surface.

A single ridge 30 with a vortex 31 on its lee side is shown in FIG. 2. The entire wing surface 20 is covered with an array of vortices recurring spanwise, spaced in accordance with the criteria noted above.

This ridge spacing assures surface fluid transport into the vortex before it suffers transition into turbulence. Continuity, of course, requires that this withdrawn spent fluid be replenished by fresh fluid brought down onto the surface from the outer flow.

The ridge-vortex system thus serves as a mechanism to collect fluid from the wing surface while still laminar but which has lost an appreciable amount of velocity in the freestream direction and before transition to the turbulent state. The convex curvature provided by ridge top 30t serves as an initial suction source for the crossflow, drawing the stagnant fluid 22s along the wing surface laterally up across the ridge. This lower velocity fluid then migrates towards the center of the vortex 31c because of the lower pressure in its core, which thereby collects and contains the spent fluid. The withdrawn fluid contained within the vortex cores is in laminar form, and it is isolated from the remainder of the boundary layer. And, of course, once this de-energized fluid is removed from the wing surface and located within the vortex core, it no longer is influenced by the wing surface, and, hence, it no longer loses energy to friction. Nor does it suffer sharp adverse velocity gradients. Accordingly, it will remain laminar while being transported downstream in vortex tube 31 and discharged aft of the wing trailing edge 20te into the outer wake 25.

The size of the ridges is sufficient relative to the boundary layer thickness and the shape of the ridges such as to generate convective accelerations in the freestream from cross-coupling terms of an order of magnitude greater than the usual freestream acceleration, i.e., $$v\frac{\partial u}{\partial y}, w\frac{\partial u}{\partial z} >> u\frac{\partial u}{\partial x}$$

where x, y, and z represent the usual orthogonal coordinate system, and u, v, and w are the corresponding velocity components. This relationship is particularly significant because ridge height is very much smaller than the distance between ridges. Preferably, the ridge heights are of the order of magnitude of the boundary layer thickness and should be no greater than an order of magnitude greater than the boundary layer thickness.

In a mathematical context, the Navier Stokes equations or the simplified boundary layer equations will be dominated by crossflow terms and cross-coupling with transverse gradients of the freestream direction flow component. FIG. 2A illustrates the coordinates. The change of velocity with location, the acceleration because of location, is $$\bar{\omega}\frac{\partial \bar{\omega}}{\partial s}$$

where ω is the velocity in the direction of fluid motion s. This expression in the Cartesian coordinates x, y and z for changes of velocity u in the x direction, i.e., x direction acceleration, becomes:

$$u\frac{\partial u}{\partial x} + v\frac{\partial u}{\partial y} + w\frac{\partial u}{\partial z}$$

The crossflow terms are v and w. The cross-coupling terms with transverse gradients are $$v\frac{\partial u}{\partial y} \text{ and } w\frac{\partial u}{\partial z}.$$

The convective terms represent the acceleration of fluid because of change of position. The term $$u\frac{\partial u}{\partial x}$$

is usually of singular importance because it is the term that represents fluid acceleration in the freestream direction because of wing shape and friction. The cross-coupling convective terms $$v\frac{\partial u}{\partial y} \text{ and } w\frac{\partial u}{\partial z}$$

in the standard wing are not sufficient to bring the vortex system from aft of the wing onto the wing plan form. With the present invention, the ridges increase the magnitude of these cross-coupling terms to such an extent that they dominate, and the freestream acceleration component because of position can be ignored. In other words, for a smooth wing with no ridges, the flow, which is primarily in the freestream or x-direction, is dominated by forces in that direction caused by airfoil section shape and friction. Hence the x-component acceleration terms are dominant, and the crossflow terms normally disregarded. And as the flow momentum is degraded by friction forces, its decreased energy level leaves it vulnerable to local flow reversals causing turbulence. For the wing with the ridges of this invention, however, the lateral and vertical accelerations in the crossflow forced by the undulating surface created by the ridges add a new source of energy that dominates the flow. Physically, the favorable crossflow pressure gradients associated with these accelerations are substantially greater than the pressure gradients and related accelerations caused by friction and the aft wing closure shaping. This is the physical basis for disregarding the axial flow acceleration term, the acceleration term in the freestream direction. At the same time the cross flow driven accelerations produced by the ridge geometry intercepts the crossflow to generate the required vortices on the wing.

The velocity in the freestream direction can be high relative to the crossflow velocities, but the change in velocity in the crossflow directions because of convection is substantially greater than the change in velocity in the freestream direction.

An order of magnitude analysis illustrates the effect of the dominance of crossflow terms and crosscoupling with transverse gradients of the freestream flow component. Because of the dominance of vertical and crossflow accelerations on the velocity in the freestream direction, Reynolds' number is determined by the characteristic length scale associated with ridge geometry and is low and within the laminar regime. This is another way of expressing the fact that each portion of the fluid remains in proximity of the wing surface for only a short distance, and leaves before undergoing sufficient momentum loss to evolve into turbulence.

Thus, the fluid in the vortex core is generally not turbulent, as it is removed from the wing surface before it changes from laminar to turbulent; it thereafter remains laminar, since it no longer loses energy to friction because of the wing surface. Each element of the fluid thereby absorbs some of the friction penalty, but not enough to cause transition to turbulence. In this manner, the effective Reynolds' number of each portion of the fluid is kept below its transition value, allowing it to remain in laminar form.

Continuity considerations require that fresh fluid descend from the outer flow to replace the spent fluid removed from the boundary layer. The mechanism is thus one of continually withdrawing spent fluid from the subboundary layer adjacent the wing surface and having it replenished by fresh fluid. In this manner the fluid adjacent the wing surface is always fresh, as the spent fluid is steadily removed.

Thus this new mechanism (1) collects and contains the spent fluid in an ordered vortex form away from the wing surface, (2) transports it in a spiral in a generally freestream direction for eventual discharge at the wing trailing edge, and (3) continually replenishes this spent fluid with fresh fluid brought down from the outer flow onto the surface.

With reference to FIGS. 1 and 2, the vortices will grow in the streamwise direction as they become ingested with spent fluid. On the aft portion 20b of wing 20, within the critical adverse pressure gradient region of the wing itself, where backflow and boundary layer separation normally take place, ridges 30 are inclined slightly in the spanwise direction, outboard on the upper surface and inboard on the lower surface. The inclination utilizes a component of the flow in the freestream direction to augment spanwise flow to drive the vortices, the spanwise flow being less intense on the back side of the wing because spanwise pressure gradients are smaller where the wing is thin than where the wing is thick. A small inclination of the ridge is illustrated in FIG. 4 for the wing upper surface 20u; the inclination forces the resultant flow 23u to go up and over vortex 31, to drive it in shear. As previously stated, this supplementary mechanism is particularly valuable in the adverse pressure gradient region 20b where the crossflow diminishes due to the reduction in pressure as the trailing edge of the wing approaches. Such augmentation of the spanwise flow 22u with a freestream component 21u provides a force to drive the vortex under these difficult conditions and assures a favorable pressure gradient within the vortex tube even within the adverse pressure reigon on the aft side of the wing, thereby maintaining the boundary layer "bleed" mechanism all the way to the wing trailing edge. In some circumstances, an inclination to intercept some flow in the freestream direction even in regions of favorable pressure gradients may be advantageous.

The local flow experienced by the wing surface is the resultant of the freestream flow component and the spanwise flow component. Its direction varies accordingly. Because spanwise flow is substantially constant, being produced as a result of the lift required to oppose the weight of the aircraft, the direction of local flow varies with the velocity of the aircraft, becoming more oriented in the freestream direction with increasing velocity. But because the crosswise flow velocity is essentially constant the mechanism of this invention can be used over a large range of speeds to utilize energy that would otherwise be wasted aft of the wing.

Thus, there are four structural elements of the ridges which contribute toward this mechanism, namely:
1. their asymmetric cross-section,
2. their close lateral spacing,
3. their size relative to the boundary layer thickness, and
4. their spanwise inclination in the adverse, aft pressure gradient region.

The vortices formed on the surface of the wing relocate forward and on the plan form of the wing the trailing vortex system existing in the wake behind a standard air foil. It uses its large energy as a vortex pump to remove spent fluid 22s from the boundary layer.

Boundary layer analysis for a conventional wing is usually concerned with the trade-off between velocity and pressure occurring on its surface due to changes in its shape. This analysis is restricted to favorable and adverse pressure gradients on the wing generated within the freestream energy level above the boundary layer. This energy level only diminishes because of viscous shear in the boundary layer.

The new system differs from this conventional wing boundary layer scenario by relocating the energy otherwise lost in its trailing vortex system into a network of standing vortices on the wing surface. The energy of this vortex system is higher than that of the fluid of a conventional wing in the same area. The pressure within the core of a vortex drops towards the axis of the vortex, and the pressure depression is a function of the energy of the vortex. This provides a suction source for spent fluid comparable to that offered by mechanical pumps burning fuel for continuously importing replacement fresh fluid with zero energy loss from the outer flow.

The vortex pump system thereby provides a high energy level on the surface of a wing compared with conventional wings by utilizing crossflow over most of the wing and by drawing fresh, energetic fluid from the main stream. The improved boundary layer energy is over the entire wing even near the trailing edge. A more favorable pressure gradient with respect to conventional wings exists even within the adverse pressure region on the back side of a wing, and the opportunity for boundary layer separation is substantially reduced.

In this manner a major portion of the energy normally discharged into the trailing vortex system simply appears earlier in a more forward location. The circulation strength, "Γ", of the vortex system remains invariant to satisfy Helmholtz's theorem. However, the mechanism as described continually withdraws spent fluid from the boundary layer into the vortex system, thereby increasing the mass of fluid over which the vorticity is spread.

The rotational energy in the pair of trailing vortices discharged by a wing is expressed by the following equation, which is derived on page 328 of Volume II of Durand, William Frederick "Aerodynamic Theory," Dover Publications, Inc., New York, 1963:

$$E_r = \frac{\rho \Gamma^2}{2\pi}\left[ l_n \frac{2b'}{r'} + \frac{1}{4} \right],$$

where
 $E_r$=rotational energy,
 $\Gamma$=circulation,
 $\rho$=air density,
 $b'$=half the vortex separation, and
 $r'$=vortex core radius.

The two terms of this expression correspond to distinct regions illustrated in FIG. 5, namely: (1) vortex core 31c which rotates as a solid body, represented by the constant term, and (2) outer irrotational field 31f, represented by the ln term.

This expression shows that most of the energy is in the outer irrotational flow field. This portion of the energy may be reduced by increasing the radius of the vortex core r' (34), say, from its conventional value $r_1'$ (34c). This is accomplished by the present process by feeding spent fluid into the vortex and expanding its core region to a value corresponding to an increased radius $r_2'$ (34e). Thus, the present system will not only conserve energy through maintenance of laminar flow, but will reduce the energy in the trailing vortex network by increasing the mass of air over which the vorticity is spread, the angular momentum being unaffected because of a corresponding drop in the angular velocity of the fluid in the vortex.

The ridges may be shaped and positioned such that most of the trailing vorticity is generated on the wing surface itself, and hence there is little occasion for further vorticity to be generated within the wake. In this case, the energy available for boundary layer bleed is large, and provides a powerful mechanism to serve as a vortex pump to remove spent boundary layer fluid and preserve laminarity in the flow.

The phenomena can be viewed in different terms. The rotational energy in the vortices is at the expense of streamwise velocity. The vortices must always be there to satisfy Helmholtz's theorem. On the back side of the wing, the velocity of the air in the boundary layer reduces because of the energy lost to vorticity. With this loss of velocity, greater separation and induced drag losses occur than would otherwise occur without vorticity. However, the vorticity energy can be used to serve the useful purpose of providing a vortex suction pump on the surface of the wing, and that is what is done here.

In addition to the energy loss to vorticity, the wing also suffers an energy loss due to viscous shear in the boundary layer that is minimized by maintaining the flow in the ordered, laminar, state. But this desirable result can be achieved only by limiting the shear burden borne by each fluid element, and this requires a suction system to continuously remove spent fluid and force its replacement with fresh fluid before the spent fluid has traveled very far.

Thus, as shown in FIG. 6 in solid profiles, the conventional wing deposits an excess of energy 34c in the form of vorticity in the wake, yet suffers an energy deficiency 23t due to turbulent shear stress in the boundary layer. The present ridge system, by relocating the vortex system forward on the wing surface as described, integrates these two energy systems, using a substantial portion of the excess energy normally in a trailing vortex system to provide laminar flow and thereby minimize the energy deficiency in the boundary layer, as shown in the dashed profiles, where 34e and 23l are the corresponding reduced values. This is done indirectly, as the energy in the vortex system is not added directly to the shear layer, but rather serves as a pump to draw off spent boundary fluid and replace it with higher energy fluid from the outer flow, thereby increasing the energy level in the boundary layer. Furthermore, expansion of the vortex core by ingestion of spent fluid spreads this rotational energy over a larger mass of fluid, so as to reduce the angular momentum per unit mass (not the total angular momentum), thereby minimizing the rotational energy in the vortex system. The integration involves a minimum discharge of energy into the wake and moves towards the superior efficiency of an ideal self-propelled body.

Many surfaces employed in fluid mechanics have a lateral pressure gradient producing a crossflow. These include the upper and lower surfaces of a wing as described, where the pressure gradient on the upper wing surface causes an inflow and on the lower surface an outflow. Similarly, the curved bottom of a ship will experience a lateral pressure gradient because of the hydrostatic pressure variation due to depth. For such cases, as shown in FIG. 7, ridges 30 may be used again in the streamwise direction to add the streamwise flow 21 to the crossflow 22 to provide an inclined flow 23, generating a series of vortices 31 on the lee side 30l of the ridges.

On bodies having no lateral pressure gradient, such as an aircraft fuselage, torpedo, or submarine, the ridges may again be shaped asymmetric and an effective crossflow provided by their inclination to the freestream direction.

As can be seen in FIG. 8 for such bodies of revolution, operating at zero angle of attack, the crossflow can be provided by a paired ridge system, where the ridge pair 30 is aligned at a slight divergence to the streamwise direction 21, producing opposing inflows to each ridge. A lesser distance would be provided between the two elements of a pair than is provided between adjacent pairs. Such a pair of ridges would generate a pair of oppositely rotating vortices.

With reference to FIG. 9, a further arrangement for surfaces having no lateral pressure gradient comprises a series of single ridges 30 inclined at a small angle to the freestream direction 21. Such individual ridges would then again generate vortices on their lee side, as described previously. These single ridges could be inclined parallel on one side of the body with an array inclined conversely on the opposing side, thus providing a right and left symmetry compatible with small changes in the angle of attack during operation at non-zero buoyancy conditions, climb, descent, or other maneuvers involving a slight asymmetry in the vertical plane.

For long surfaces such as a fuselage or submarine, or even a long chord wing, alternate ridges (or pairs) would be smoothly faired out allowing their vortices to be absorbed into those of adjacent neighbors, as in the well known vortex pairing mechanism, as illustrated in FIG. 10.

Alternatively, as shown in FIG. 11, a ridge 30 could be terminated within the body length in a vertical trailing edge 30te, thereby discharging its vortex 31 at a greater elevation above the surface 30, thus minimizing interference with the lower boundary layer flow.

It is clear from this disclosure and its accompanying set of figures that the means for employing waste energy to provide a vortex pump to insure laminar flow on the surface of a wing or body have been described in detail, and the magnitude of the provisions disclosed may be varied according to engineering considerations for different conditions as required.

While the preferred form and method of employing the invention have been described and illustrated, it is to be understood that the invention lends itself to numerous other embodiments without departing from its basic principles.

What is claimed is:

1. An improvement in an aircraft having a wing with a lower surface and an upper surface, the two surfaces being joined at a leading and a trailing edge, the thickness of the wing increasing from the leading edge to a maximum thickness and then decreasing to the trailing edge such that in flight the wing generates a static pressure on the upper surface that is lower than on the lower surface to generate lift, the wing having a streamwise direction and a spanwise direction transverse to the streamwise direction, the improvement comprising:

a plurality of substantially uninterrupted ridges on at least the upper of the surfaces, the ridges extending from in front of the maximum thickness and past the maximum thickness towards the trailing edge of the wing, generally in a parallel array and generally in the streamwise direction, the height, orientation and length of each ridge being such that the cross-coupling terms of the streamwise accelerations are an order of magnitude greater than the acceleration of the streamwise flow due to the wing shape and friction over substantially the entire wing, i.e., $$v\frac{\partial u}{\partial y}, w\frac{\partial u}{\partial z} >> u\frac{\partial u}{\partial x},$$

whereby the spanwise flow over each of the ridges generates a standing vortex on its lee side, each vortex: (1) providing a suction source to collect low energy boundary layer fluid near the surface of the wing and formed from flow in the freestream direction, (2) providing a conduit to transport such spent fluid aft for discharge into the wake beyond the wing trailing edge, and (3) forcing continuous replenishment by fresh fluid from the outer stream to maintain laminar flow on the surface of the wing.

2. The improvement claimed in claim 1 wherein the ridges are spaced at a lateral distance "l" less than the product of the chord length "c" of the wing and the ratio of the maximum spanwise velocity "V" to the maximum streamwise velocity "U", i.e.:

$$l < \frac{V}{U} c.$$

3. The improvement claimed in claim 2 wherein the values of spanwise velocity and freestream velocity are taken at cruise and level flight.

4. The improvement claimed in claim 2 wherein the ridges have an inclination on their windward side at least on the upper wing surface aft the maximum thickness to utilize freestream fluid velocity in addition to spanwise flow in the driving of the standing vortex aft of the maximum thickness.

5. The improvement claimed in claim 1 wherein the ridges have a greatest height proximate the maximum thickness of the wing, the height of the ridges being no greater than an order of magnitude greater than the boundary layer thickness.

6. The improvement claimed in claim 5 wherein the ridges fair smoothly into the wing surface proximate the trailing edge.

7. The improvement claimed in claim 2 wherein the ridges increase in section in both height and width from the leading edge to their greatest section.

8. The improvement claimed in claim 1 wherein the height of the ridges is no greater than an order of magnitude of the boundary layer thickness.

9. The improvement claimed in claim 8 wherein the height of the ridges is no greater than the boundary layer thickness.

10. An improvement in an aircraft having a wing of finite span and both a lower surface and an upper surface, the two surfaces being joined at a leading and trailing edge, the improvement comprising:

a plurality of spaced apart and substantially continuous ridges on at least the upper of the surfaces oriented to utilize the spanwise flow induced by the finite span to relocate the trailing vortices onto the surface of the wing, the vortices providing a suction source to collect the stagnant sub-boundary layer from the upper surface of the wing, the vortices then providing conduits to transport such low energy fluid aft for discharge into the wake beyond the wing trailing edge and forcing continuous replacement of the low energy fluid by fresh fluid from the outer stream to maintain laminar flow on the upper surface of the wing, the ridges, having a height, width and shape such that the streamwise accelerations due to cross-coupling effects are an order of magnitude greater than the acceleration of the streamwise flow due to the wing shape, i.e., $$v\frac{\partial u}{\partial y}, w\frac{\partial u}{\partial z} >> u\frac{\partial u}{\partial x}$$

where v is spanwise velocity, y is spanwise distance, w is vertical velocity, z is vertical distance, u is streamwise velocity and x is streamwise distance; and the ridges are spaced a lateral distance "l" less than the product of the chort length "c" of the wing and the ratio of the maximum spanwise velocity "V" to the maximum streamwise velocity "U", i.e., $$l < \frac{V}{U} c.$$

11. The improvement claimed in claim 10 wherein the ridges have a greatest height at and proximate to the maximum thickness of the wing, the ridges aft of their greatest height decreasing in height.

12. The improvement claimed in claim 1 wherein the ridges have a greatest width at and proximate to the maximum thickness of the wing, the ridges aft of their greatest width decreasing in width.

13. The improvement claimed in claim 10 wherein the ridges are asymmetric in section having a modest inclination on their windward side to provide a smooth flow up that side and a more vertical inclination on their lee side to generate the standing vortex.

14. The improvement claimed in claim 13 wherein the values of the spanwise velocity and freestream velocity are taken at cruise and level flight.

15. The improvement claimed in claim 14 wherein the ridges have an inclination in the spanwise direction on their windward side at least on the upper wing surface and aft the maximum thickness to utilize freestream fluid velocity in addition to spanwise flow in the driving ot he standing vortex aft of the maximum thickness.

16. The improvement claimed in claim 15 wherein the ridges have a greatest height at and proximate to the maximum thickness of the wing, the ridges aft of their greatest height decreasing in height.

17. The improvement claimed in claim 16 wherein the ridges have a greatest width at and proximate to the maximum thickness of the wing, the ridges aft of their greatest width decreasing in width, and the ridges are asymmetric in section having a modest inclination on their windward side to provide a smooth flow up that side and a more vertical inclination on their lee side to generate the standing vortex.

18. The improvement claimed in claim 10 wherein the height of the ridges is no greater than an order of magnitude greater than the boundary layer thickness.

19. In a streamlined body of revolution having a series of ridges, an improvement comprising:
   (a) the body having a forward apex, an intermediate surface of greatest circumference after the apex, and an aft closure after the intermediate surface, all disposed about an axis; and
   (b) the ridges being inclined at a small angle to the axis and originating between the apex and the surface of greatest diameter, a first short set of the ridges decreasing in section, fairing out smoothly and terminating on the surface, and a second set of the ridges continuing past the termination of the first set to increase vortex size by merger of adjacent vortices formerly confined by short ridges of the first set alternating every other one with ridges of the second set.

20. The improvement claimed in claim 19 wherein the ridges on one side of the body are inclined all in the same sense and the ridges on the opposite side of the body are inclined in the opposite sense.

21. A method of reducing drag on an air foil of finite span having an upper surface and a lower surface, the upper surface being longer than the lower surface along a freestream direction, the method comprising the steps of:
   (a) providing relative motion between a fluid and the air foil in a freestream direction;
   (b) inducing vortices along the upper surface from the spanwise flow resulting from the finite span of the air foil being intercepted by continuous ridges running generally in the freestream direction from ahead of the air foil's maximum thickness aft;
   (c) inducing by the height and shape of the ridges an acceleration of the fluid in the boundary layer in the freestream direction due to cross-coupling terms of an order of magnitude greater than the acceleration of the fluid in the freestream direction from friction and air foil shape;
   (d) collecting low energy boundary layer fluid formed by the motion in the freestream direction in the vortices by the relatively low pressure there;
   (e) transporting the collected fluid in the vortices in the freestream direction and discharging the spent fluid in a wake aft of the trailing edge of the airfoil; and
   (f) replacing the low energy fluid by fresh fluid from the freestream through low pressure close to the wing surface.

* * * * *